July 5, 1955 H. T. SHERMAN 2,712,596

BINAURAL RADIO SYSTEMS

Filed June 18, 1952

INVENTOR

Harold T. Sherman,

BY Moore & Hall

ATTORNEYS

United States Patent Office 2,712,596

Patented July 5, 1955

2,712,596

BINAURAL RADIO SYSTEMS

Harold T. Sherman, New York, N. Y.

Application June 18, 1952, Serial No. 294,200

5 Claims. (Cl. 250—6)

This invention relates to methods of and apparatus for binaural voice radio transmission and more particularly to an improved and simplified system for transmission of binaural signals.

The tremendous advantages of binaural transmission are well known in the prior art and various patents and publications have proposed systems for transmitting binaural signals. In general these prior art systems fall into two classes (1) two similar transmitters operating on adjacent channels to transmit the two binaural signals and (2) two modulations representing the two binaural signals on a single carrier. Both of these systems have the serious objection that they require a wider transmission band than has been allocated to any single radio station. The primary object of my invention is to overcome this drawback. Other objects of my invention relate to providing an improved binaural receiver.

At present many broadcasting stations having frequencies between 550 and 1500 kilocycles also have a "frequency modulated" transmitter operating in a band extending from 88 to 108 megacycles. I propose to transmit one of the two binaural signals over the standard broadcast transmitter and the other one over the frequency modulation transmitter, and to use two receivers for receiving and detecting the two signals. I also contemplate certain improvement features in which certain controls at the two receivers are ganged together.

Figure 1:
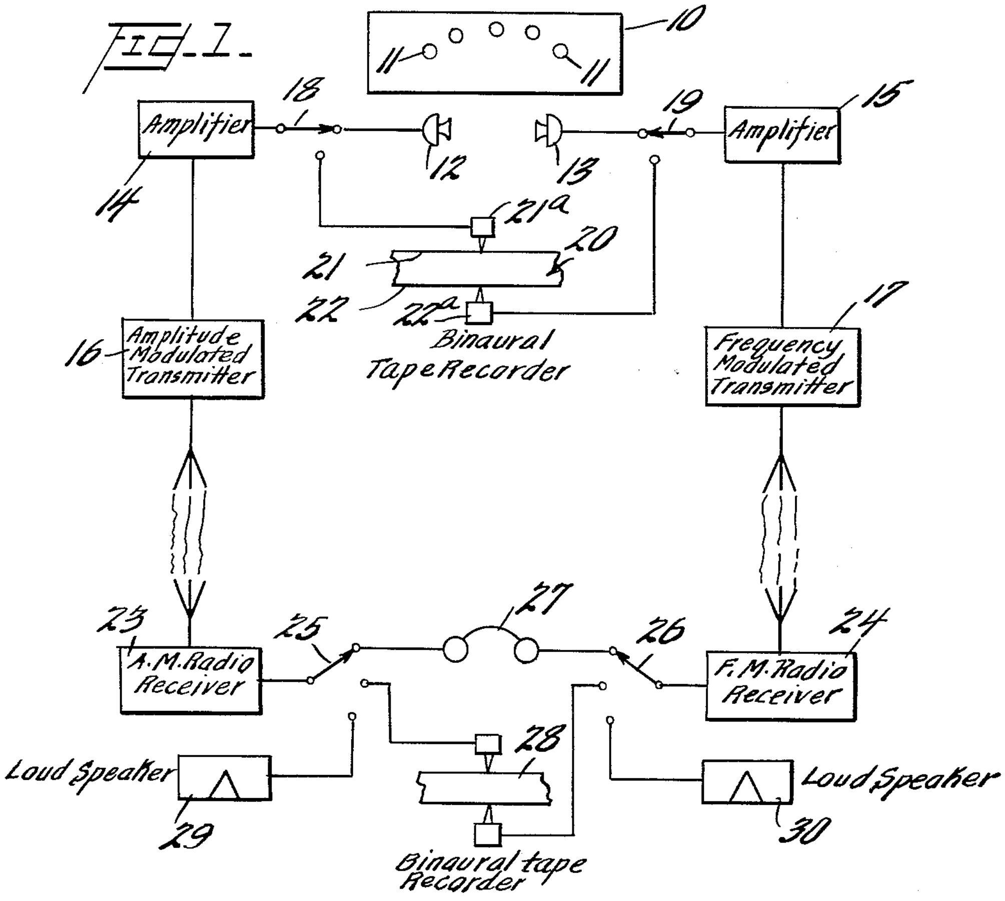
Figure 1 is a block diagram of my new binaural transmitting and receiving system.

In Figure 1, a stage 10, or other object, has performers 11 for producing voice or musical sounds which are to be transmitted by radio. Two microphones 12 and 13 spaced apart about equal to the spacing of the two human ears and respectively arranged to have directional properties about the same as the two ears of a human being are located in front of stage 10. The microphones 12 and 13 respectively feed amplifiers 14 and 15 which in turn respectively feed amplitude modulation transmitter 16 and frequency modulation transmitter 17. Transmitter 16 preferably operates in the standard broadcast band which extends from 550 to 1500 kilocycles whereas transmitter 17 preferably operates in the standard frequency modulation band which extends from 88 to 108 megacycles.

When it is desired to transmit recorded programs instead of "live" ones, switches 18 and 19 are thrown down so that the tape recorder 20 feeds the two amplifiers 14 and 15. Tape recorder 20 has two recording edges 21 and 22 on opposite edges of the tape and two pick-up elements 21*a* and 22*a*. Binaural tape recordings are well known in the prior art and the details of the method and apparatus for making them need not be stated in detail, it being sufficient to say that the two recordings on the opposite edges of the tape are made simultaneously with the use of microphones spaced apart the same as described in connection with microphones 12 and 13.

At the receiving station in Figure 1, the AM receiver 23 detects and reproduces the transmissions of transmitter 16, and the FM receiver 24 detects and reproduces the transmissions of transmitter 17. Switches 25 and 26 enable the listener to select any one of headphones 27, tape recorder 28, or loudspeakers 29 and 30. When the headphones 27 are used the two earphones are respectively connected to receivers 23 and 24. When the binaural tape recorder 28 is used the two opposite edges of the tape are respectively impressed with recordings from receivers 23 and 24. When the loudspeakers 29 and 30 are used, one of them is positioned to direct the sound produced thereby toward one ear of the listener while the other loudspeaker is positioned to direct its sound output toward the other ear of the listener.

Figure 2:
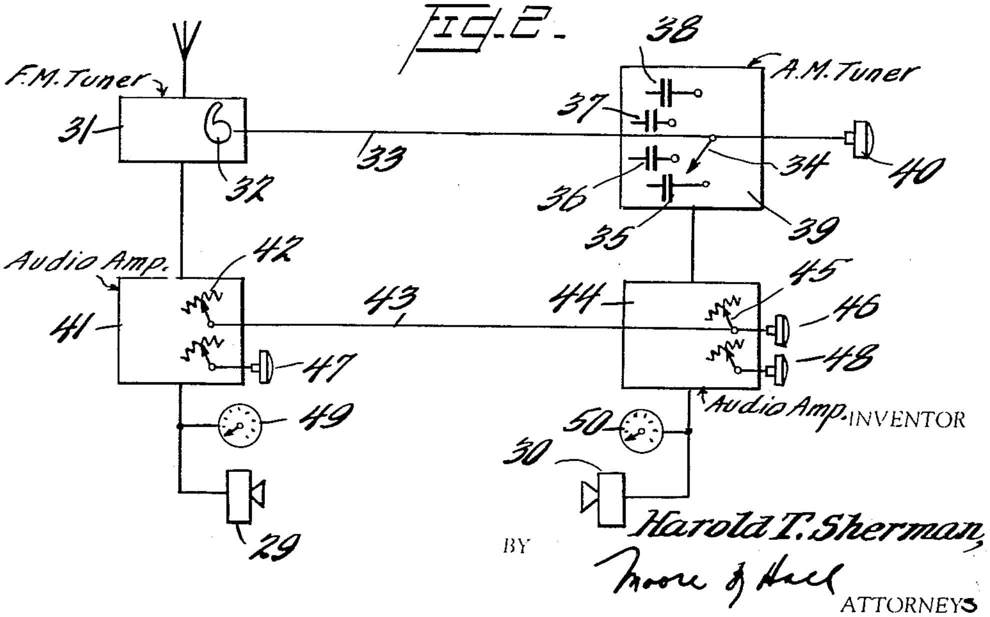
Figure 2 is a block diagram of the improved receiver.

Figure 2 illustrates certain details of the receiving system of Figure 1 in greater detail. The receiver 23 of Figure 1 includes an AM tuner 39 and an audio amplifier 44. The receiver 24 of Figure 1 includes an FM tuner 31 and an audio amplifier 41. The FM tuner is of conventional design and therefore has variable condenser plates 32 (which cooperate with fixed plates not shown) to vary the tuning of receiver 24 over the range from 88 to 108 megacycles in the well known way. Plate 32 is controlled by shaft 33 which controls switch arm 34 which in turn selects one of condensers 35, 36, 37 and 38 and switches it into the tuning circuit of the AM receiver 39. The shaft 33 may be controlled by dial 40.

Assume that there are four broadcast stations in a given city using binaural system of transmission. Station A may have its FM station at 106 megacycles, and its AM station on 600 kilocycles. Hence, when the dial 40 is set to position condenser plate 32 to receive 106 megacycles, the switch 34 is connected to condenser 35 which has the necesary capacity whereby AM tuner 39 receives 600 kilocycles. The same procedure is followed in selecting the capacities of condensers 36, 37 and 38 for the other three radio stations.

The audio amplifiers 41 and 44 have separate and independent volume controls 47 and 48. There is another volume control 46 for the two amplifiers. Volume control 46 jointly controls potentiometers 42 and 45 so that the volume of both the binaural signals may be simultaneously raised or lowered. Indicating instruments 49 and 50 may be employed to measure the average level in the two channels, or in the alternative a single instrument may be connected to measure the differential power in the two channels. In operation, the volume controls 47 and 48 are adjusted until the two channels have the same levels and from then on further volume adjustments are made with volume control 46.

It is understood of course that the audio frequency modulations of transmitter 16 may be received on any standard broadcast receiver in the ordinary way, and that the frequency modulation transmissions of transmitter 17 may be received on a conventional frequency modulation receiver in the conventional way. Hence, my system produces all of the results of present radio stations that transmit both FM and AM signals and in addition produces the new result that the listener may if desired combine the output of his AM and FM sets to produce a binaural sound output.

I claim to have invented:

1. A radio system for producing binaural signals at a receiver comprising an amplitude modulation transmitter operating in a band extending from 550 to 1500 kilocycles, a frequency modulation transmitter covering territory in common with that covered by the amplitude modulated one and operating in a frequency band extending from 88 to 108 megacycles, means for producing binaural signals to be transmitted and for feeding one of them to one of said transmitters and the other of them to the other transmitter; and a radio receiving system operating in said territory and having all of the following parts, a frequency modulation tuner adjustable to the frequency of said frequency modulation transmitter, an amplitude modulation tuner adjustable to the frequency of the amplitude modulation transmitter, a control element movable to a single given position to tune both of said tuners to their respective transmitters and including means for tuning the frequency modulation tuner to the frequency of the frequency modulation transmitter when the control element is moved to said given position and to tune the amplitude modulation tuner to the frequency of the amplitude modulation transmitter when the control element is moved to said given position, separate amplifiers for respectively amplifying the outputs of said tuners, separate volume control adjusting means for the two amplifiers, indicating means to indicate any differential in the outputs of the amplifiers whereby the volumes may be adjusted to be equal, additional means for simultaneously similarly varying the gain of the two amplifiers, and spaced loudspeakers respectively connected to the outputs of said amplifiers.

2. A receiver for binaural signals comprising a frequency modulated tuner, an amplitude modulation tuner, an audio amplifier for each tuner, means connected to each amplifier to independently adjust the level of its output, additional means connected to both amplifiers for simultaneously adjusting the levels of their outputs, indicating means for indicating any difference in outputs of the two amplifiers, and means for utilizing the binaural output resulting from the outputs of the two amplifiers.

3. A receiver as defined in claim 2 in which the last-named means is a tape recorder including means for recording the two outputs on a single tape.

4. A receiver as defined in claim 2 in which the last-named means comprises spaced loudspeakers fed by the two amplifiers respectively.

5. A receiver for binaural signals comprising a frequency modulated tuner, an amplitude modulation tuner, an audio amplifier for each tuner, indicating means for indicating any difference in outputs of the two amplifiers, means for adjusting the relative gains of the amplifiers whereby the outputs of the amplifiers may be adjusted until the aforesaid indicating means shows equal outputs from the two amplifiers, and separate spaced loud speakers fed by the two amplifiers respectively.

References Cited in the file of this patent

UNITED STATES PATENTS

| | | |
|---|---|---|
| 1,513,973 | Doolittle | Nov. 4, 1924 |
| 2,561,338 | Camras | July 24, 1951 |

FOREIGN PATENTS

| | | |
|---|---|---|
| 258,865 | Great Britain | Dec. 1, 1927 |

OTHER REFERENCES

"Binaural Transmission," Wireless World, May 1941, pages 130, 131.